(12) United States Patent
Smiroldo

(10) Patent No.: US 6,847,653 B1
(45) Date of Patent: Jan. 25, 2005

(54) PROTOCOL FOR VOICE AND DATA PRIORITY VIRTUAL CHANNELS IN A WIRELESS LOCAL AREA NETWORKING SYSTEM

(75) Inventor: Michael Smiroldo, Pacifica, CA (US)

(73) Assignee: Interwave Communications International, Ltd., Hamilton (BM)

( * ) Notice: Subject to any disclaimer, the term of this patent is extended or adjusted under 35 U.S.C. 154(b) by 0 days.

(21) Appl. No.: 09/552,286

(22) Filed: Apr. 19, 2000

Related U.S. Application Data

(60) Provisional application No. 60/164,663, filed on Nov. 9, 1999.

(51) Int. Cl.[7] .................................................. H04J 3/02
(52) U.S. Cl. ......................... 370/462; 370/403; 375/132
(58) Field of Search ................................. 370/462, 458, 370/459, 460, 461, 449, 455, 342, 343, 345, 346, 348, 322, 326, 468, 498, 431, 441, 442, 434

(56) References Cited

U.S. PATENT DOCUMENTS

| | | | |
|---|---|---|---|
| 5,583,866 A | * 12/1996 | Vook | 370/312 |
| 5,654,968 A | 8/1997 | Smiroldo | 370/443 |
| 5,721,735 A | 2/1998 | Smiroldo | 370/442 |
| 5,802,060 A | * 9/1998 | Fischback | 370/444 |
| 5,889,772 A | * 3/1999 | Fischer | 370/346 |
| 5,982,779 A | * 11/1999 | Krishnakumar | 370/447 |
| 6,078,572 A | * 6/2000 | Tanno | 370/335 |
| 6,256,478 B1 | * 7/2001 | Allen | 455/63 |
| 6,404,772 B1 | * 6/2002 | Beach | 370/443 |
| 6,567,458 B1 | * 5/2003 | Kagaya | 375/132 |

* cited by examiner

*Primary Examiner*—Douglas Olms
*Assistant Examiner*—Ricardo M. Pizarro
(74) *Attorney, Agent, or Firm*—Dorsey & Whitney LLP

(57) ABSTRACT

The present invention is a communications protocol which provides for voice and data priority channels in order that both voice and data information have equal opportunity to transmit over a communications network. This is achieved by splitting the 25 millisecond FCC dwell time into two 12.5 millisecond halves, and dedicating one half to voice packets and the other half to data frames. In the voice priority channel, the frequency hopping interval is doubled. Additionally, both channels operate independently, each maintaining independent bidding, data transmission, acknowledgement and retransmission. Pad packets are used to insure voice channel connectivity.

9 Claims, 13 Drawing Sheets

|  | High Priority Setting | | | | |
|---|---|---|---|---|---|
|  | 5 | 4 | 3 | 2 | 1 |
| Dwell 0 | High Retrans List<br>High Poll List<br>Low Retrans List<br>Low Poll List | Low Retrans List<br>Low Poll List<br>High Retrans List<br>High Poll List | Low Retrans List<br>Low Poll List<br>High Retrans List<br>High Poll List | Low Retrans List<br>Low Poll List<br>High Retrans List<br>High Poll List | Low Retrans List<br>Low Poll List<br>High Retrans List<br>High Poll List |
| Dwell 1 | High Retrans List<br>High Poll List<br>Low Retrans List<br>Low Poll List | High Retrans List<br>High Poll List<br>Low Retrans List<br>Low Poll List | High Retrans List<br>High Poll List<br>Low Retrans List<br>Low Poll List | High Retrans List<br>High Poll List<br>Low Retrans List<br>Low Poll List | High Retrans List<br>High Poll List<br>Low Retrans List<br>Low Poll List |
| Dwell 2 | High Retrans List<br>High Poll List<br>Low Retrans List<br>Low Poll List | Low Retrans List<br>Low Poll List<br>High Retrans List<br>High Poll List | Low Retrans List<br>Low Poll List<br>High Retrans List<br>High Poll List | Low Retrans List<br>Low Poll List<br>High Retrans List<br>High Poll List | High Retrans List<br>High Poll List<br>Low Retrans List<br>Low Poll List |
| Dwell 3 | High Retrans List<br>High Poll List<br>Low Retrans List<br>Low Poll List | High Retrans List<br>High Poll List<br>Low Retrans List<br>Low Poll List | High Retrans List<br>High Poll List<br>Low Retrans List<br>Low Poll List | High Retrans List<br>High Poll List<br>Low Retrans List<br>Low Poll List | High Retrans List<br>High Poll List<br>Low Retrans List<br>Low Poll List |
| Dwell 4 | High Retrans List<br>High Poll List<br>Low Retrans List<br>Low Poll List | Low Retrans List<br>Low Poll List<br>High Retrans List<br>High Poll List | Low Retrans List<br>Low Poll List<br>High Retrans List<br>High Poll List | High Retrans List<br>High Poll List<br>Low Retrans List<br>Low Poll List | High Retrans List<br>High Poll List<br>Low Retrans List<br>Low Poll List |
| Dwell 5 | High Retrans List<br>High Poll List<br>Low Retrans List<br>Low Poll List | High Retrans List<br>High Poll List<br>Low Retrans List<br>Low Poll List | High Retrans List<br>High Poll List<br>Low Retrans List<br>Low Poll List | High Retrans List<br>High Poll List<br>Low Retrans List<br>Low Poll List | High Retrans List<br>High Poll List<br>Low Retrans List<br>Low Poll List |
| Dwell 6 | High Retrans List<br>High Poll List<br>Low Retrans List<br>Low Poll List | Low Retrans List<br>Low Poll List<br>High Retrans List<br>High Poll List | High Retrans List<br>High Poll List<br>Low Retrans List<br>Low Poll List | High Retrans List<br>High Poll List<br>Low Retrans List<br>Low Poll List | High Retrans List<br>High Poll List<br>Low Retrans List<br>Low Poll List |
| Dwell 7 | High Retrans List<br>High Poll List<br>Low Retrans List<br>Low Poll List | High Retrans List<br>High Poll List<br>Low Retrans List<br>Low Poll List | High Retrans List<br>High Poll List<br>Low Retrans List<br>Low Poll List | High Retrans List<br>High Poll List<br>Low Retrans List<br>Low Poll List | High Retrans List<br>High Poll List<br>Low Retrans List<br>Low Poll List |

APPENDIX A

FIG. 14

PROTOCOL FOR VOICE AND DATA PRIORITY VIRTUAL CHANNELS IN A WIRELESS LOCAL AREA NETWORKING SYSTEM

CROSS REFEFENCE TO RELATED APPLICATIONS

This application claims priority from U.S. Provisional Application Ser. No. 60/164,663 filed Nov. 9, 1999, the full disclosure of which is hereby incorporated by reference.

BACKGROUND OF THE INVENTION

1. Field of the Invention

The present invention relates generally to wireless local area networking and more particularly to the creation of voice and data priority channels which allows for the effective transfer of voice packets and data frames over a wireless network such that both channels enjoy relative efficiency without suffering degradation with regard to either transfer.

2. The Prior Art

Digital data communications networks are known, consisting of one or more centrally located nodes in communication with multiple distributed remote nodes over spread spectrum full duplex radio frequency links. The purpose of the network system is to transfer user digital data packets between user equipment installations located at the central and remote nodes. This is accomplished by accepting user data packets at the central and remote nodes, encapsulating them within a communications protocol used between the central node and remote nodes over the spread spectrum RF (radio frequency) link, and then returning them to the user equipment at the correct destination. The overall scheme of the network system is shown in FIG. 1.

Referring first to FIG. 1, the environment comprises a digital data communications network, with a central node(s) 10 in communication with a multiplicity of remote nodes 20 over full duplex radio frequency links. The network system transfers user digital data packets between user equipment installations located at the central and remote nodes. User data packets are accepted at the central and remote nodes, having been encapsulated within a communications protocol used between the central and remote nodes over an RF link, and returning the data packets to the user equipment at the correct location.

For the purposes of this invention, data transmission can be roughly grouped into two categories, streamed data and acknowledge-gated data. Streamed data is exemplified by voice and video applications which typically run under the UDP (User Datagram Protocol) sub-protocol of IP (Internet Protocol). In this format, data packets are injected into the IP network at essentially the same rate as they are created. The design requirements for streamed data center primarily around low packet handling times at each IP subsystem along the packet route, since both video and voice are real-time based data systems and induced packet delays along the way can become quite detectable to the user. Packet drop-outs in this mode are a lower priority concern than delay, since the integration capability of the human auditory and visual senses compensates for minor packet drop-outs. The streamed UDP data of voice and video applications usually originate at real-time level sampling devices, making the nature of such transmission small sized packets (in the range of tens to low hundreds of bytes per packet) provided by the IP network at regular and short time intervals (in the range of tens of milliseconds). The major performance factor in this model is the number of packets transferred per second over the RF link, since the packet handling overhead of the protocol far exceeds the processing of the packet-contents.

Acknowledge-gated data is primarily carried by the TCP (Transmission Control Protocol) sub-protocol of IP and is exemplified by such applications as FTP (File Transfer Protocol). In this model, the reservoir of data at the originator is large and non-real time based. Delay in processing data packets along the transmission route is not as critical as in the streamed model, since the data reservoir is fixed and does not change over time. The central design factor in gated transmission is accuracy, rather than latency. The normal gated application carves the data reservoir into relatively large packets (tens of hundred of bytes), sends a small number of such packets to the destination, and then stops transmission until the destination acknowledges reception of those packets. The number of packets sent in a single acknowledged burst is kept small in order to minimize the time required to effect retransmission should the packets not arrive at the destination accurately. The pause in transmission is caused by the half duplex nature of the IP network foundation (ethernet), which prevents the streamed data packet transmission and simultaneous acknowledgement usually found in full duplex protocols (e.g. SNA, Systems Network Architecture). In the data mode model, the relevant performance figure is data transfer rate in kilobits per second, since the packets are large and packet handling overhead small with respect to the processing of the packet contents.

The differences in these two modes of operation make it difficult, if not impossible, to handle both with maximum efficiency and performance at the same time. If one attempts to optimize for small unacknowledged UDP packets, the larger TCP packets must be fractured into small pieces then reassembled at the destination, a philosophy guaranteed to introduce protocol complexity, inefficiency, and larger processor usage. There is no single mode of operation which will optimize both protocol models simultaneously.

SUMMARY OF THE INVENTION

Rather than attempt a single compromise protocol, the present invention provides a protocol having two discreet modes of operation: data mode and voice mode. Data mode is targeted at the TCP (Transmission Control Protocol) transfers concerned with FTP (File Transfer Protocol) throughput and other applications where large chunks of data are moved accurately at high kbs rates without major latency concerns. Voice mode is targeted at transfers, the primary concern of which, is phone connections, packets per second throughput, packet latency, and fast error recovery procedures to minimize accumulated error delay. While the two are not particularly compatible they are not mutually exclusive.

A low voice usage in data mode will work for the occasional phone call, and provisions have been put in place to maintain a programmable rate of TCP data transmission while in the UDP (User Datagram Protocol) voice mode. While both modes of operation represent design compromises to its alternate protocols, wide enough range of configuration options have been provided to make the protocol satisfy most practical needs. The running of an FTP benchmark application while in voice mode will necessarily diminish the performance level of the bench mark. Attempting to utilize, for example, 3 phones on a remote configured for data mode will necessarily disappoint the analysis. The goal of the present invention is to provide the widest range of satisfactory performance to as many application combinations as possible, knowing that optimization of the two requirements simultaneously is not practically achievable.

The present invention is a communications protocol which provides for voice and data priority channels in order that both voice and data information have equal opportunity to transmit over a communications network each achieving its own relative efficiency. The existing system protocol maintains a 25 millisecond dwell which has been approved by the FCC. In order to avoid the burden of re-approval, the present invention simply splits the 25 millisecond FCC dwell time into two 12.5 millisecond halves, and dedicating one half to voice packets (the voice priority channel) and the other half to data frames, (the data channel). In the voice priority channel, the frequency hopping interval is doubled. Additionally, both channels operate independently, each maintaining independent bidding, data transmission, acknowledgement and retransmission. Pad packets are used to insure voice channel connectivity.

The radio protocol supports two discreet dwell timings. When the voice priority channel is disabled, protocol timing uses the longer 25 ms dwell length. This longer dwell permits the maximum sized 1500 byte data frames to be handled in a single dwell without fracturing it into pieces. When voice priority is enabled, the dwell timing reverts to a 13 ms dwell. This allows the protocol to retransmit a dropped voice packet before a new packet arrives from the voice source at approximately 20 or 30 ms intervals. In order to keep the RF frequency hops at roughly the same interval in both protocol dwell timings, two 13 ms voice dwells occur between each RF hop.

The difference between the two dwell times is the number of data panes defined for remote transmission, and the free-data size of data transmission time at the central. All other dwell components and timings are the same in the two schemes.

BRIEF DESCRIPTION OF THE DRAWINGS

In the drawings which illustrate the best modes presently contemplated for carrying out the present invention.

APPENDIX A (FIG. 14) shows a servicing order of the central node's poll and retransmission lists in each dwell of the eight dwell set for the five priority level settings.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons.

Remote Packet Handling in Data Mode

Figure 1:
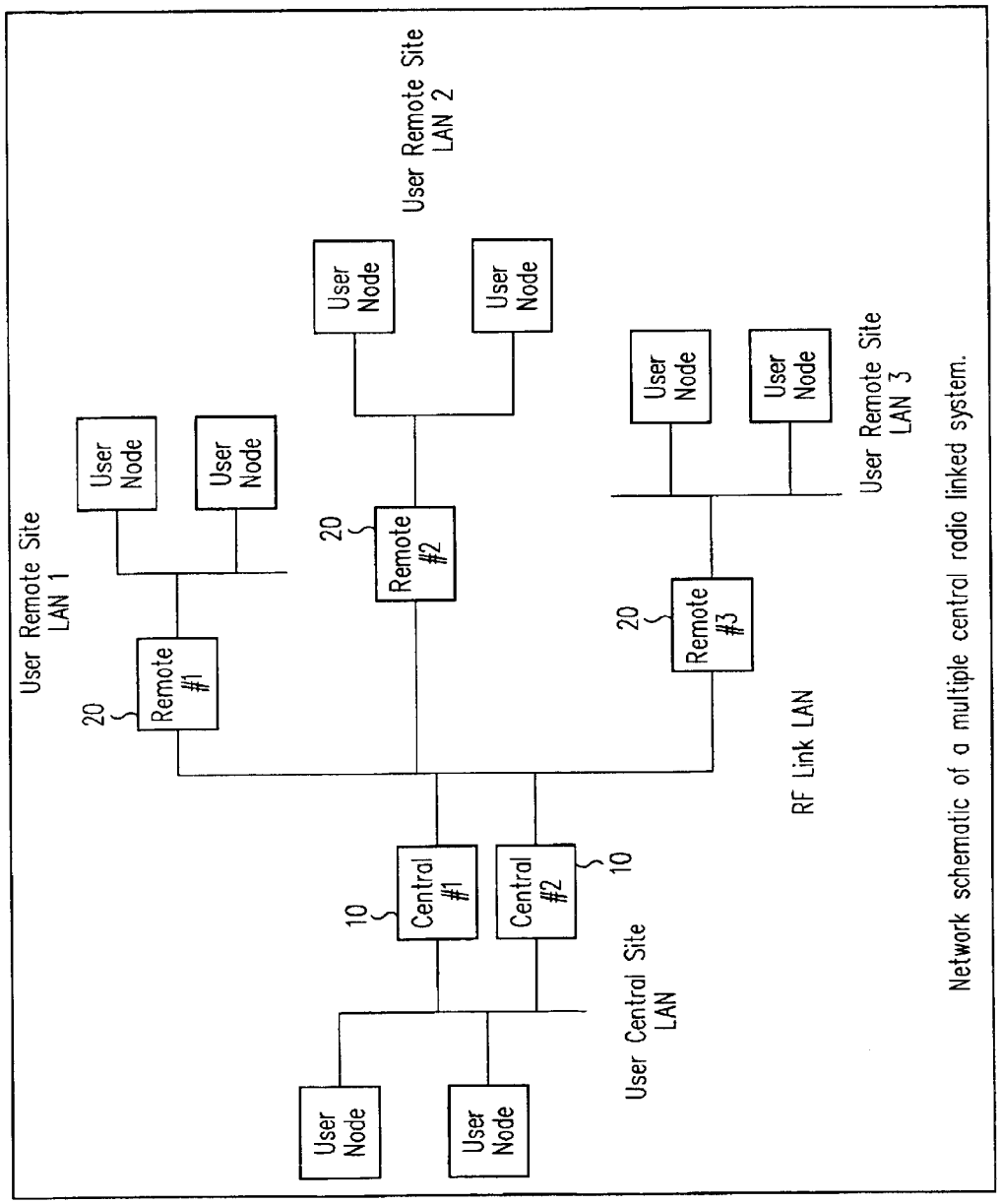
FIG. 1 shows a network schematic of a multiple central radio linked system.
Figure 2:
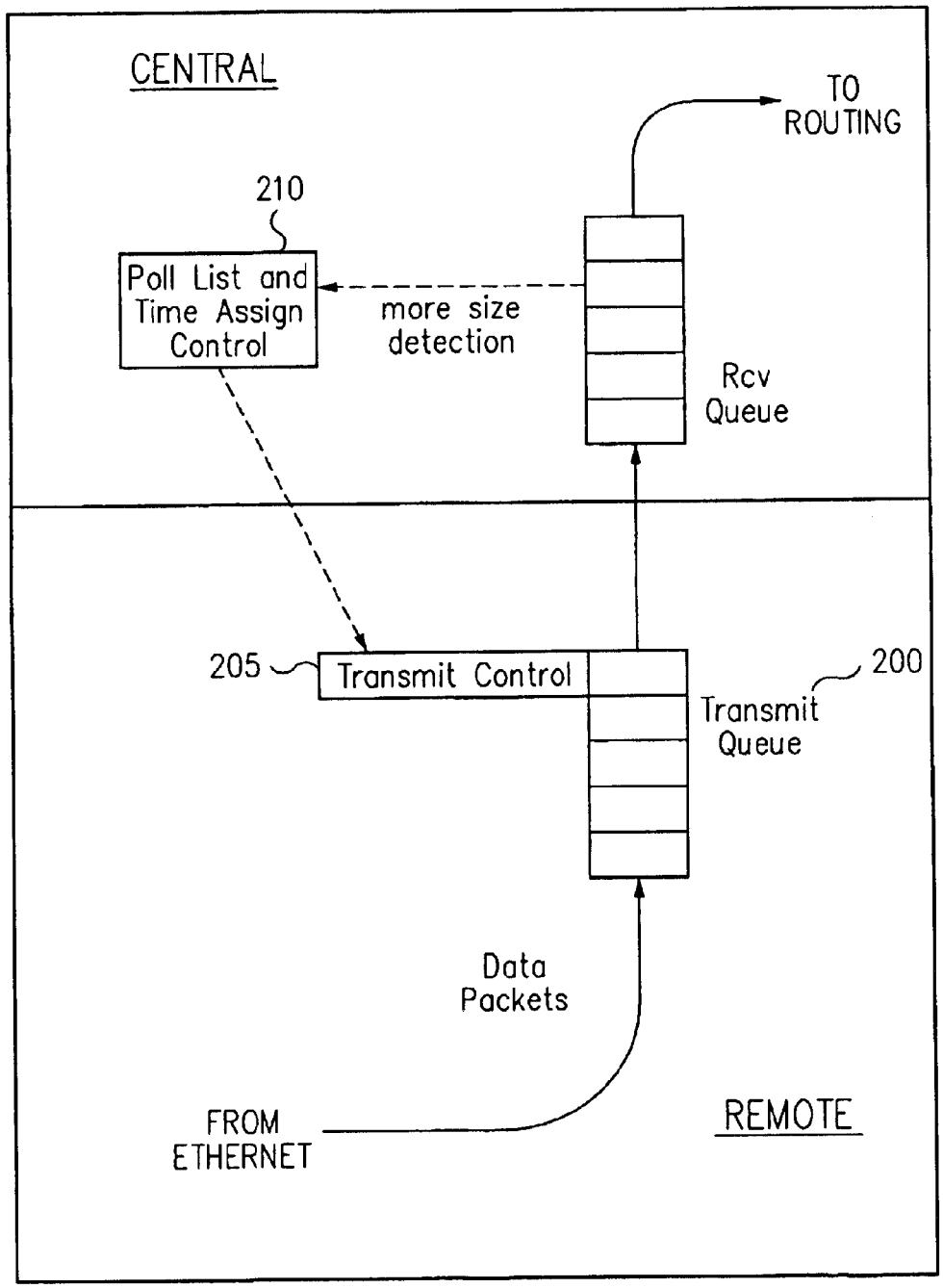
FIG. 2 shows the key elements of data mode packet transfer from remote to central.

The essential elements for effecting packet transfer in the data mode from the remote node to the central node are shown in FIG. 2. Packets arriving from the ethernet interface are concatenated into "mega-buffers" and placed in the transmit queue 200. From there the remote's transmit controller 205 will bid for transmission time assignment, check acknowledgement, and possibly re-transmit as needed. At the central node, mega-buffers received from the remote node are split back into ethernet packets in their original size, checked for "more" size requests, and forwarded to their appropriate destinations. Bid and "more" size requests are handled at the central node by the poll list and time assignment control, 210.

Concatenation and Transmit Queuing

Figure 3:
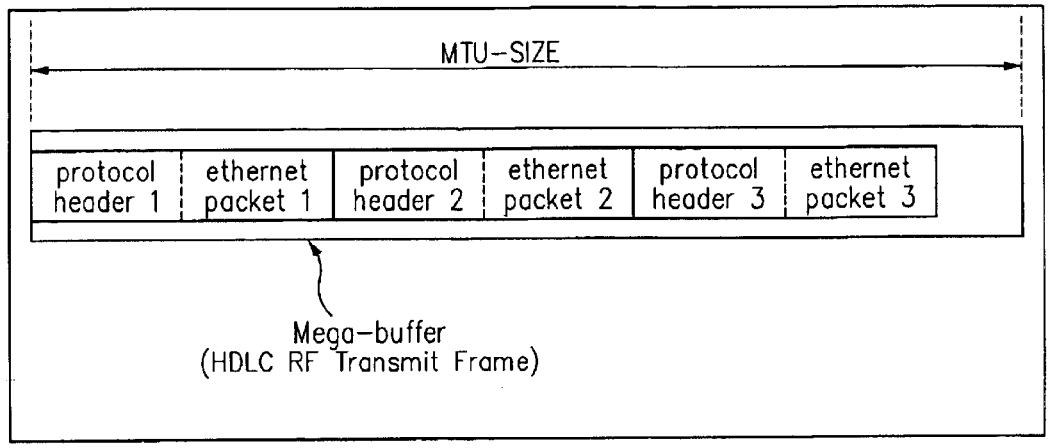
FIG. 3 shows the construction detail of a mega-buffer.

As packets arrive from ethernet during a dwell they are first routed to the concatenation logic. This is because some ethernet packets can be quite small, compared to the carrying capacity of the dwell. As such it is most efficient to group up a bunch of such small packets into one large packet, which then makes better use of the RF bandwidth. This occurs at both the central nodes and remote nodes. If the destination address of the ethernet packet has not occurred in the current dwell, a mega-buffer for that destination is opened. As other ethernet packets arrive for the same destination, they are appended to the packets already in the mega-buffer for that destination. Each ethernet packet is written with its own protocol data header, which states the packet type and size. Should a newly arrived ethernet packet cause the mega-buffer contents to exceed the MTU (Maximum Transfer Unit) size in effect, a new buffer is opened for that destination. FIG. 3 shows the construction detail of a mega-buffer. One such buffer is sent over the RF link as a single HDLC (High-Level Data Link Control) frame. Accordingly, it generates one transmit and one receive interrupt. At the end of each dwell, the transmit controller closes all open mega-buffers and transfers them to the transmit queue.

Aside from including a FIFO (first in, first out) list of mega buffers ready for transmission, the transmit queue logic also provides sizing services to the transmit controller. When queried by the transmit controller, the queue handler begins an assessment of the transmit queue contents. It looks at the first mega-buffer and determines the number of data panes required to send it. Should the number of panes be less than the twelve available in a dwell, the queue handler adds the next buffer in the list to the first and determines the number of panes required to send the pair of buffers. This continues until adding buffer N to the chain causes the chain to overflow the 12 panes available. The queue handler then returns to the transmit controller the value of N−1 of buffers to be sent in a single dwell, and the number of panes required to send them.

Transmit Control Structure

Figure 4:
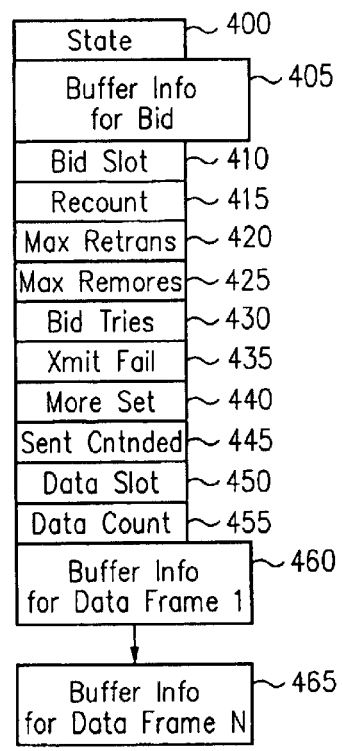
FIG. 4 shows the key elements of a transmit control structure.

The key element to the transmit control logic is the transmit control structure, the primary elements of which are shown in FIG. 4. There are two such structures, one which is being acted upon in the current dwell, and one that is being prepared for the next dwell. Understanding the operation of the transmit controller in association with its pair of structures is critical to the understanding of the operation of the protocol as a whole. What follows is an explanation of such operation with a brief outline of the important fields in the transmit structure.

State 400. The state is the location in the transmit state diagram which reflects the "state" of the transmit structure 400 which are: "done," "awaiting bid dwell," "awaiting more acknowledgment" and "awaiting data acknowledgment." The currently defined states are as follows:

Done. This transmit structure has completed its transmission tasks and is available for preparation for a new set of such tasks.

Awaiting Bid Dwell. This transmit structure has data frames to send but a bid transmission is required to schedule that transmission. The structure is waiting for the congestion management software to indicate that transmission of a bid is appropriate in this dwell.

Awaiting More Acknowledgement. A bid, or a data frame with a more size request, has been sent to the central, and the transmit structure is now waiting for the requisite time assignment. This wait state will time out after an appropriate number of dwells, generating a "more time-out."

Awaiting Data Acknowledgement. A data frame was transmitted in this dwell, and must be acknowledged by the central in this dwell. The transmit structure is waiting for the acknowledgement frame at the end of the dwell to verify central reception of the data frame.

Bid Buffer Information 405. To reduce transmit interrupt time, all parameters needed to load a frame into the transmit hardware are calculated in advance. Details such as the address of the start of the frame, the number of bytes that will be transmitted, etc. are precalculated and made available to the frame transmission logic in the transmit structure. This buffer information block is for the bid frame.

Bid Slot 410. This field is normally set to ff (inactive). Upon receipt of a sync/time frame at the remote node, if the transmit control structure that is being processed in the current dwell is set to "Awaiting Bid Dwell," and the congestion management MIB indicates that bid transmission is appropriate in this dwell, a random selection of 0 or 1 is made and loaded into the bid slot field. This indicates to the frame transmission logic in which bid slot the bid frame (defined in the bid buffer information block) should be sent in this dwell. Once the bid is sent, this field is returned again to ff (inactive).

Max Retrans Count 420, Max More Count 425, Recount Register 415.

The remote nodes request from the central node a time slot (either via a bid frame, or a bid buried in a data frame) in which to transmit its data inbound. The remote nodes then wait for the central node to schedule a slot. The question becomes, how long should the remote node wait before it determines that its request was not received at the central node and should be re-requested?

The answer depends on how many other remotes are in line ahead of the requesting remote. Other remotes may have made similar requests earlier (they are on the "Max More Count" list), or a remote may have transmitted a frame that was recieved at the central in error and must be scheduled for retransmition (the retransmit list or "Max Retrans Count").

In order for a remote to determine how long it should wait, it gets the lengths of those two lists from the central node each dwell and calculates for itself a reasonable wait period, which it puts into the max retrans and max more count variables. When it makes a request for transmission, it moves one of those variables to the recount register and begins to count it down, one count each dwell. When the counter hits 0, its a timeout and the remote repeats its request.

The remote node has two time-out values it might need in a given dwell. The first is needed when a bid or a data frame with a "more" size is sent and the transmit control structure is in an "awaiting more acknowledgement" state. That time-out value is pre-calculated when the transmit structure is prepared, and loaded into the "max more count" field. When the structure first moves into the "awaiting more ack" state, the value in the "max more count" field is copied to the "recount" field. In each succeeding dwell in which a time assignment is not detected from the central node, the "recount" field is decremented.

When the count field is decremented to zero, a "more" time-out has happened (by definition). The "max more count" is calculated in data mode to be the sum of the poll list depth and retransmission list depth, sent out by the central node in the sync/time frame, plus an additional hedge factor of 4 counts. The sum of the list depths would be enough, if each of those requests proceeded error free. If a remote is told there are four other remotes ahead of it, then it could logically expect to be "up" in the fifth dwell, assuming nothing goes wrong with the other four (no dwells are missed, for example). However, such an assumption would rarely hold true, so an additional 4 counts are added to the "max more count" calculation to allow for failed transmissions.

The second time-out value is needed if a data frame is sent to the central node but not acknowledged in the same dwell. The remote node moves from "awaiting data ack" to "awaiting more ack" states in anticipation of a "more" grant from the central node due to the central node retransmission logic. In such a case, the "recount" field is copied from the "max retransmission count" field, rather than the "max more count" field. The "max retrans count" is calculated in data mode to be the sum of the retransmission list depth, sent out by the central node in the sync/time frame, plus a fudge term of 4. Since at the central node the retransmission list has a higher priority than the poll list, the poll list depth is excluded from the calculation.

Bid Tries 430, Xmit Fail 435, More Set 440.

Having experienced a "more time-out", the only option for the remote node is to revert to the "awaiting bid dwell" state to re-bid and begin the cycle again. When such occurs the "bid tries" field is incremented. When the "bid tries" field reaches a maximum value (10), the remote declares the frame to be unsendable. The transmit structure state is moved to "Done" and the "Xmit Fail" field is set to a non-zero value. The data frame will later be discarded as though it were successful, but the xmit fail indication will be noted for statistical purposes as well as one functional need.

If the data frame in the current dwell's active transmit structure carries a "more size", the transmit control structure being prepared for the next dwell need not set the "awaiting bid dwell" state, but may go directly to "awaiting more ack." When the prepared transmit structure becomes the active one, the structure will begin a "more time-out" period awaiting time assignment from the "more" size request in the previous dwell. If however, the previous dwell became "done" due to an xmit failure, no time assignment from the central will be forthcoming, so the "awaiting bid dwell" state is the appropriate one to set in the second structure when it becomes active. The "more set" field and the "Xmit fail" field are used in combination to change the state of the transmit structure when it is moved to active, to force a bid cycle.

Sent Contended 445.

This field indicates that the remote has skipped the bid/time assignment cycle and has opted to move directly to data transmission in a "contended" mode.

Data Slot 450.

Normally set to FF (inactive) this field is set to the data pane number in which data frame transmission is to begin in the current dwell. It is set from the time assignment issued by the central. The frame transmission logic will use this value to time loading of the data frame into the transmission hardware at the appropriate time.

Data Count 455, Data Frame Buffer Info 460.

Data frames being prepared to be sent in the next dwell have their relevant transmit hardware parameters loaded into the data frame buffer information block array in the transmit structure being prepped. Frame transmit parameters are loaded into each information block in the array in a FIFO (first in, first out) order, and with each such loading the "data count" field is incremented. When the time arrives for transmission of the data frames in the current dwell, the set of frame buffer parameters are loaded into the transmit hardware "data count" times. Buffer information is loaded for all data frames up to and including data frame N, 465.

Transmit Controller Operation

Having described the fields, the operation of the protocol is now described. It is assumed that prior to dwell 1, no significant activity is under way at the remote node being described, but that other remote nodes in the system have been, and continue to be, active. Both transmit control structures are in the "done" state, and no transmissions or state changes are occurring from one dwell to the next at the remote node under discussion other than the transmission of a txTest frame every dwell (for purposes of measuring transmit output power level). The two transmit control structures (called A structure and B structure) are alternating positions between "currently active" and "ready for prep" every dwell, but to no effect since no packet transfer is under way.

Dwell 1

Transmit control structure A is active and in the "done" state. A txTest frame will be issued at the end of this dwell and a transmit output power level measurement will be taken (as it is every dwell).

Figure 5:
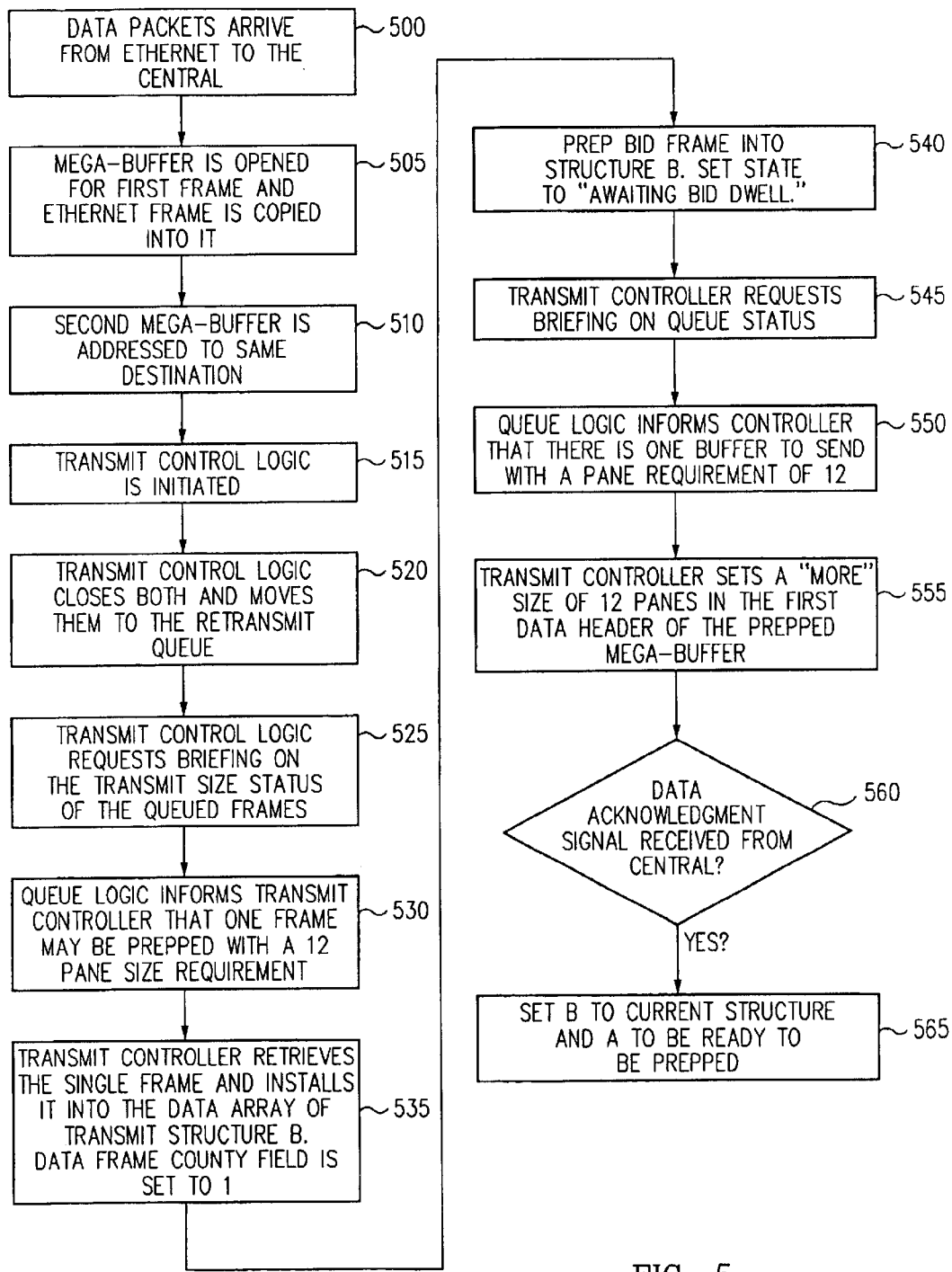
FIG. 5 is a schematic showing priority channelization.

A flow chart describing the operation of this dwell is given in FIG. 5. Two 1500 byte data packets arrive from ethernet, addressed to the central 500. For the first frame, a megabuffer is opened and the ethernet frame is copied into it 505. Since the first mega-buffer is at its MTU size limit, the second ethernet frame causes opening of a second megabuffer addressed to the same destination 510.

Near the end of the dwell the transmit control logic is awakened for processing 515. The transmit controller first looks at the mega-buffer status and sees two open buffers. It closes both and moves them to the transmit queue 520. It then calls on the queue handling logic to brief it on the transmit size status of the queued frames 525. The queue logic informs the transmit controller that there is one frame that may be prepped with a size requirement of 12 panes 530. The transmit controller retrieves the single frame and installs it into the data frame array of transmit structure B and sets the data frame count field to 1 535. Since no prior transmissions have been recently issued, a bid is required to get a time assignment for transfer of the frame now installed in structure B. A bid frame is prepped into structure B with a size request of 12 panes and a priority level of "low" (all data transmission in data mode are of priority "low"). The state of structure B is set to "awaiting bid dwell" 540.

The transmit controller now calls again on the queue handler to brief it on the current queue status 545. The handler informs the controller that there is one buffer to send with a pane requirement of 12 (the second 1500 byte ethernet packet) 550. The transmit controller sets in the first data header of the prepped mega-buffer (which in this case is the only data header in the mega-buffer) a "more" size of 12 panes. The "more set" field of transmit structure B is set.

Reception of the data acknowledgement frame from the central node at the end of dwell 1 with "current" structure A set to the "done" state causes structure B to become "current" and structure A to become the one ready to be prepped 560, 565.

Dwell 2

Figure 6:
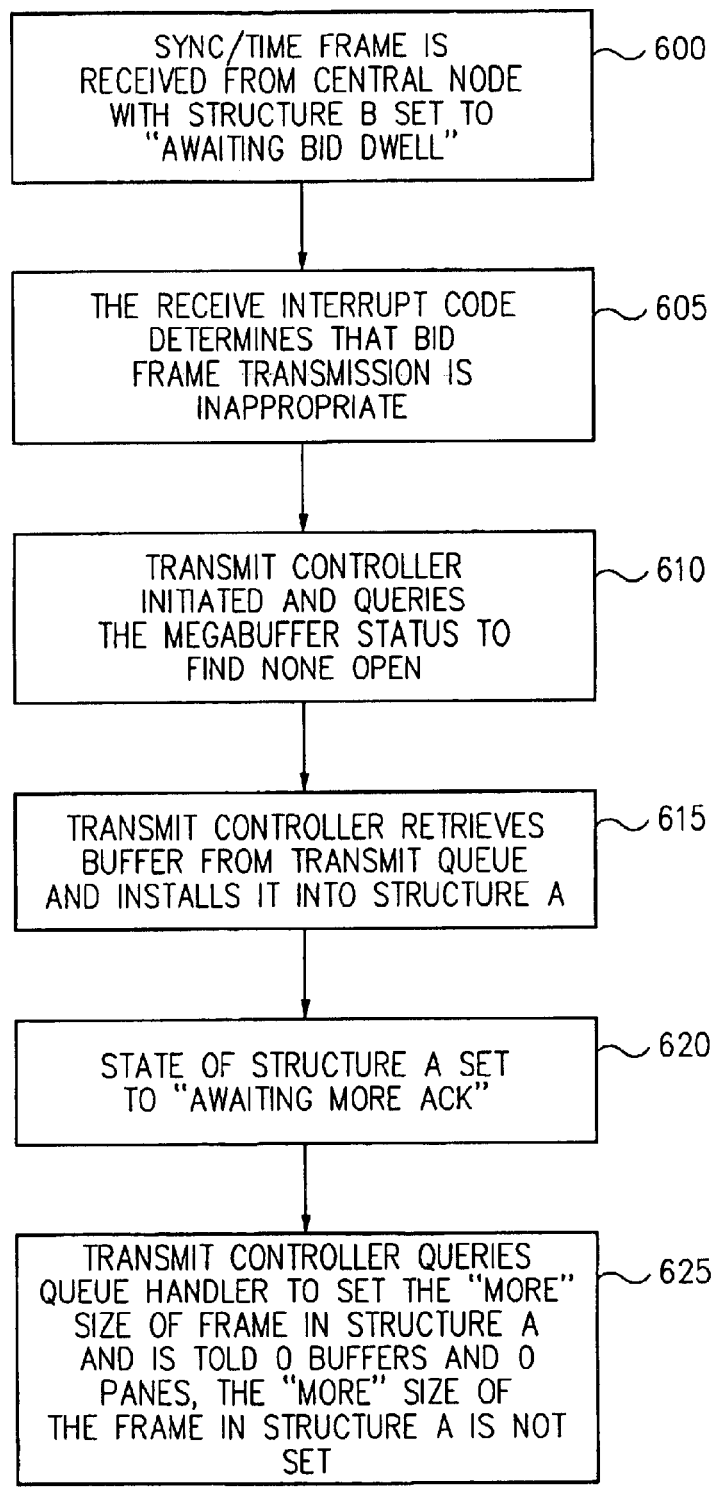
FIG. 6 shows a flow chart describing the operation of dwell 2.

A flow chart describing the operation of this dwell is given in FIG. 6. The sync/time frame is received from the central node with structure B set to "awaiting bid dwell" 600. The receive interrupt code interrogates the congestion management MIB (Manage Information Base) to determine if bid frame transmission is appropriate 605. It is not.

Near the end of the dwell the transmit controller is awakened, and regarding the mega-buffer status it finds none open 610. It looks at the results of its queue query from last dwell and remembers that structure B is carrying a "more" request for one buffer of 12 pane size. It retrieves the buffer from the transmit queue and installs it into structure A, 615. Since the "more" size is set in structure B no bid is needed, so the state of structure A is set to "awaiting more ack" 620. The controller now queries the queue handler again to set the "more" size of the frame in structure A, and is told 0 buffers and 0 panes 625. The "more" size of the frame in structure A is not set.

Dwell 3

Figure 7:
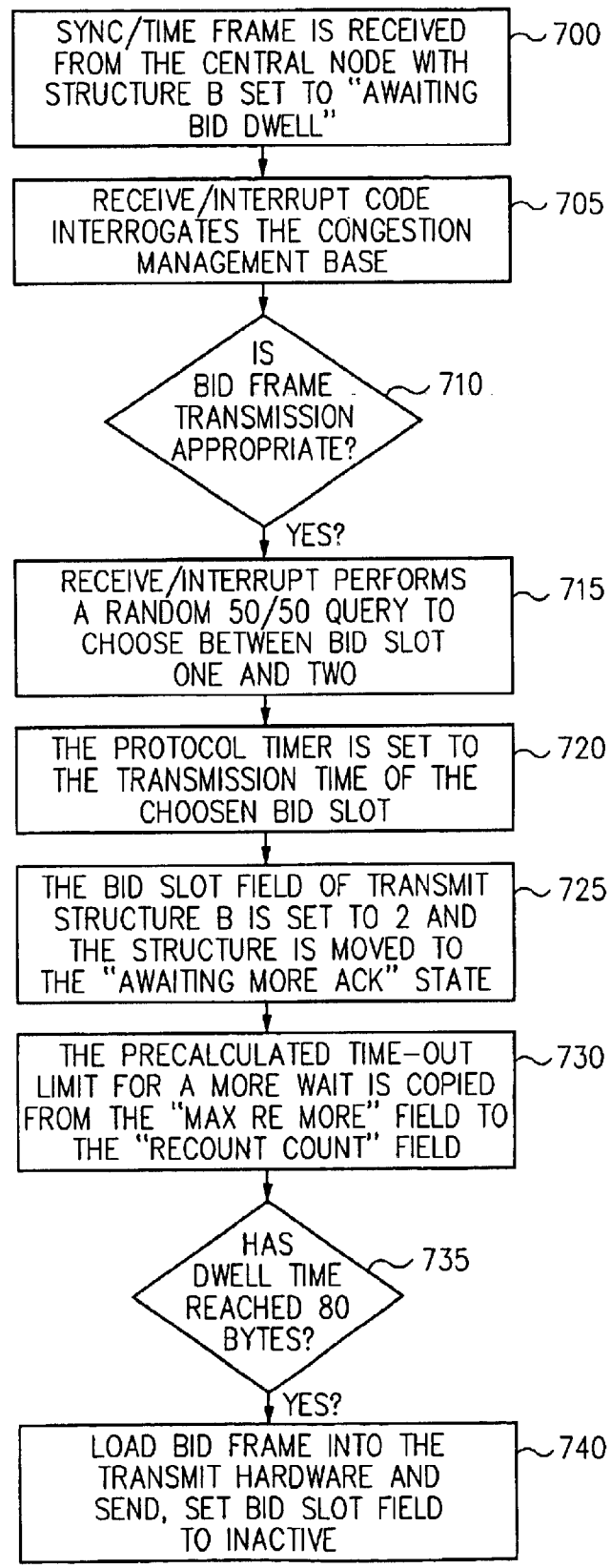
FIG. 7 shows a flow chart describing the operation of dwell 3.

A flow chart describing the operation of this dwell is given in FIG. 7. The sync/time frame is received from the central node with structure B set to "awaiting bid dwell" 700. The receive interrupt code interrogates the congestion management MIB to determine if bid frame transmission is appropriate and determines that it is 705, 710. The receive interrupt performs a random 50/50 "heads or tails" query and comes up with the random answer of bid slot 2, 715. The protocol timer is set to 80 bytes into the dwell (the transmission time of bid slot 2) 720. The bid slot field of transmit structure B is set to 2and the structure is moved to the "awaiting more ack" state 725. The pre-calculated time-out limit for a more wait is copied from the "max reMore" field to the "recount count" field 730.

At 80 byte times into the dwell the timer interrupt occurs 735. In that interrupt the bid slot field of the currently active transmit structure (B) is seen to be set to 2 so the bid frame is loaded into the transmit hardware and sent 735. The bid slot field is returned to ff (inactive) 740. Near the end of the dwell the transmit controller is awakened, but with both structures not "done" and no mega-buffers open there is nothing for it to do.

Dwell 4

Figure 8:
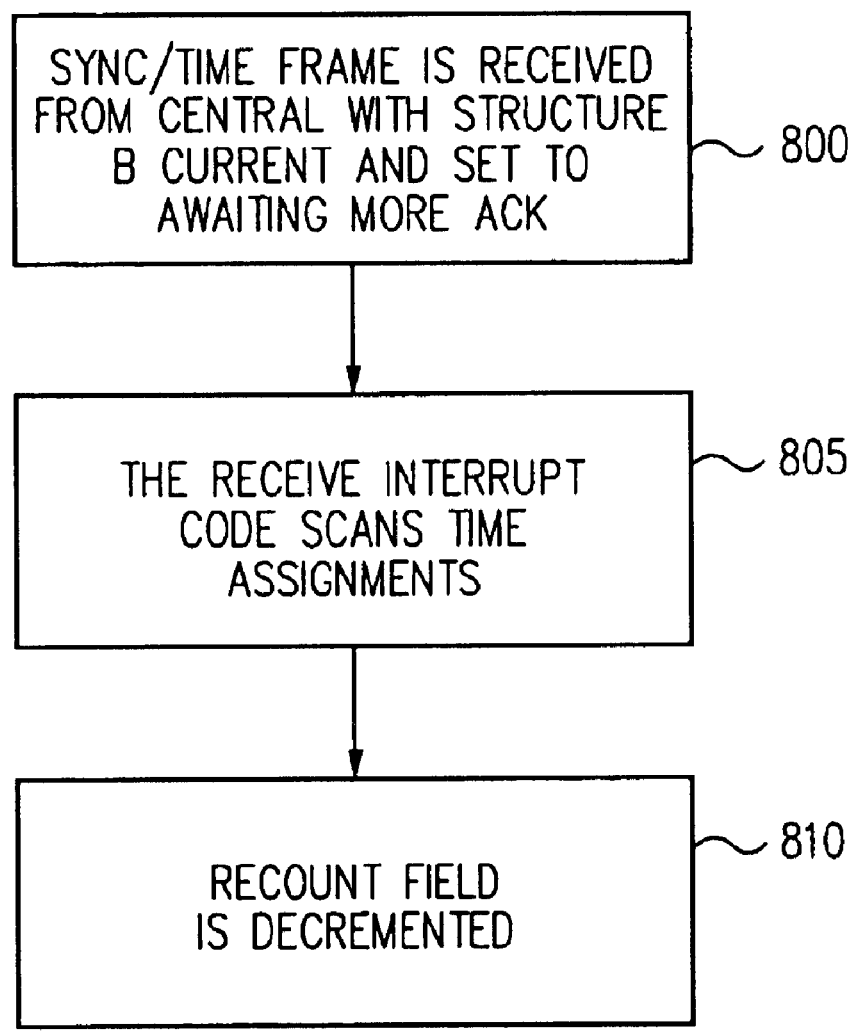
FIG. 8 shows a flow chart describing the operation of dwell 4.

A flow chart describing the operation of this dwell is given in FIG. 8. The sync/time frame is received from the central node with structure B "current" and set to "awaiting more ack" 800. The receive interrupt code scans the time assignments in the sync/time frame and finds none 805. The "recount" field is decremented but does not yet reach 0, 810. Again, the transmit controller has no actions it can perform. Dwell 5

Figure 9:
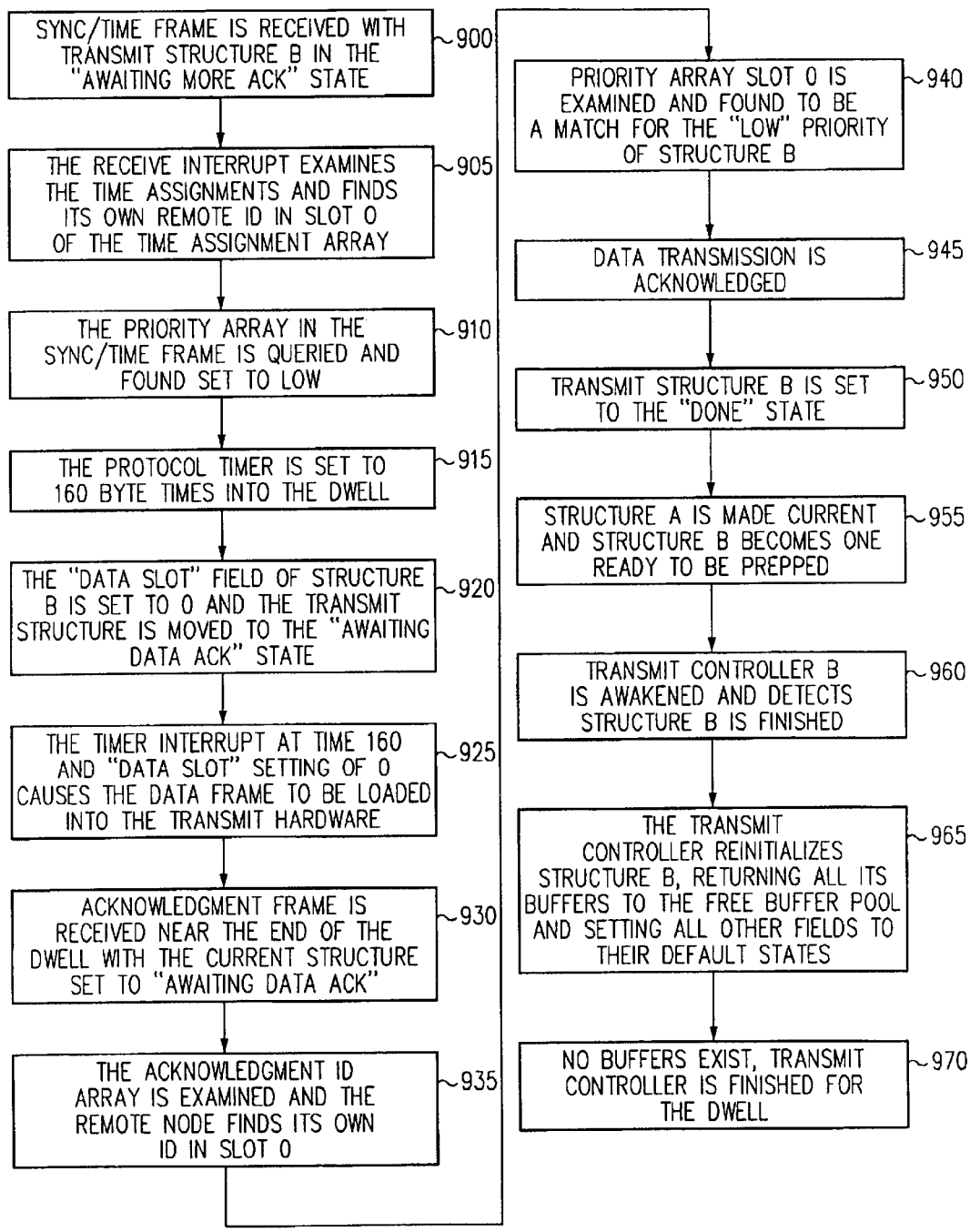
FIG. 9 shows a flow chart describing the operation of dwell 5.

A flow chart describing the operation of this dwell is given in FIG. 9. The sync/time is received with transmit structure B (the one that is current) in the "awaiting more ack" state 900. The receive interrupt examines the time assignments and finds its own remote ID in slot 0 of the time assignment array 905. The priority array in the sync/time frame, slot 0, is examined and found to be set to "low" 910. This constitutes a time assignment for the remote with transmission to begin at the start of data pane 0, 915. The protocol timer is set to 160 byte times into the dwell, the start time of pane 0. The "data slot" field of structure B is set to 0 and the transmit structure is moved to the "awaiting data ack" state 920.

The timer interrupt at time 160 and a "data slot" setting of 0 causes the data frame to be loaded into the transmit hardware. Since this is data mode, no other transmission can take place 925. The acknowledgement frame is received near the end of the dwell with the current transmit structure set to "awaiting data ack" 930. The acknowledgement ID array is examined and the remote node finds its own ID in slot 0,935. The priority array, slot 0, is examined and found to be a match for the "low" priority of structure B, 940. The data transmission has been acknowledged 945.

The transmit structure B is set to the "done" state, 950. Structure A is made "current" and structure B becomes the one ready to be prepped 955. The transmit controller is awakened and detects structure B is finished 960. The transmit controller reinitializes structure B, returning all its buffers to the free buffer pool and setting all other fields to their default states 965. Since no buffers exist in the transmit queue the controller is finished for the dwell 970.
Dwell 6

Figure 10:
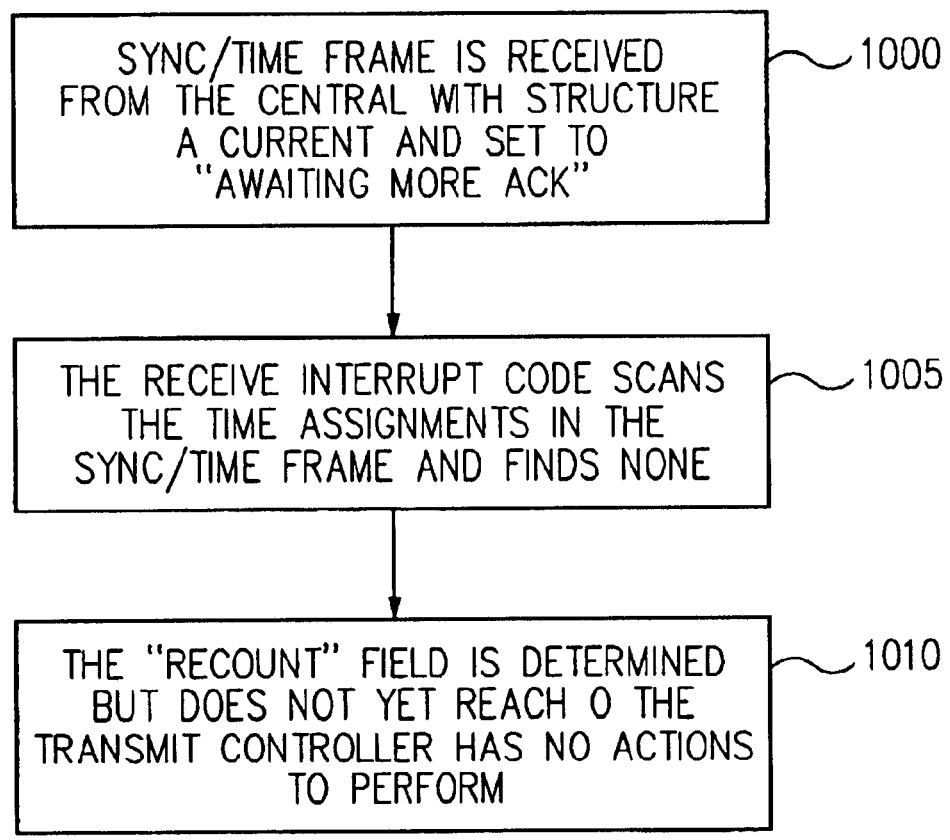
FIG. 10 shows a flow chart describing the operation of dwell 6.

The operation of this dwell is shown with the flowchart of FIG. 10. The sync/time frame is received from the central node with structure A "current" and set to "awaiting more ack" 1000. The receive interrupt code scans the time assignments in the sync/time frame and finds none 1005. The "recount" field is decremented but does not yet reach 0. The transmit controller has no actions it can perform 1010.
Dwell 7

Figure 11:
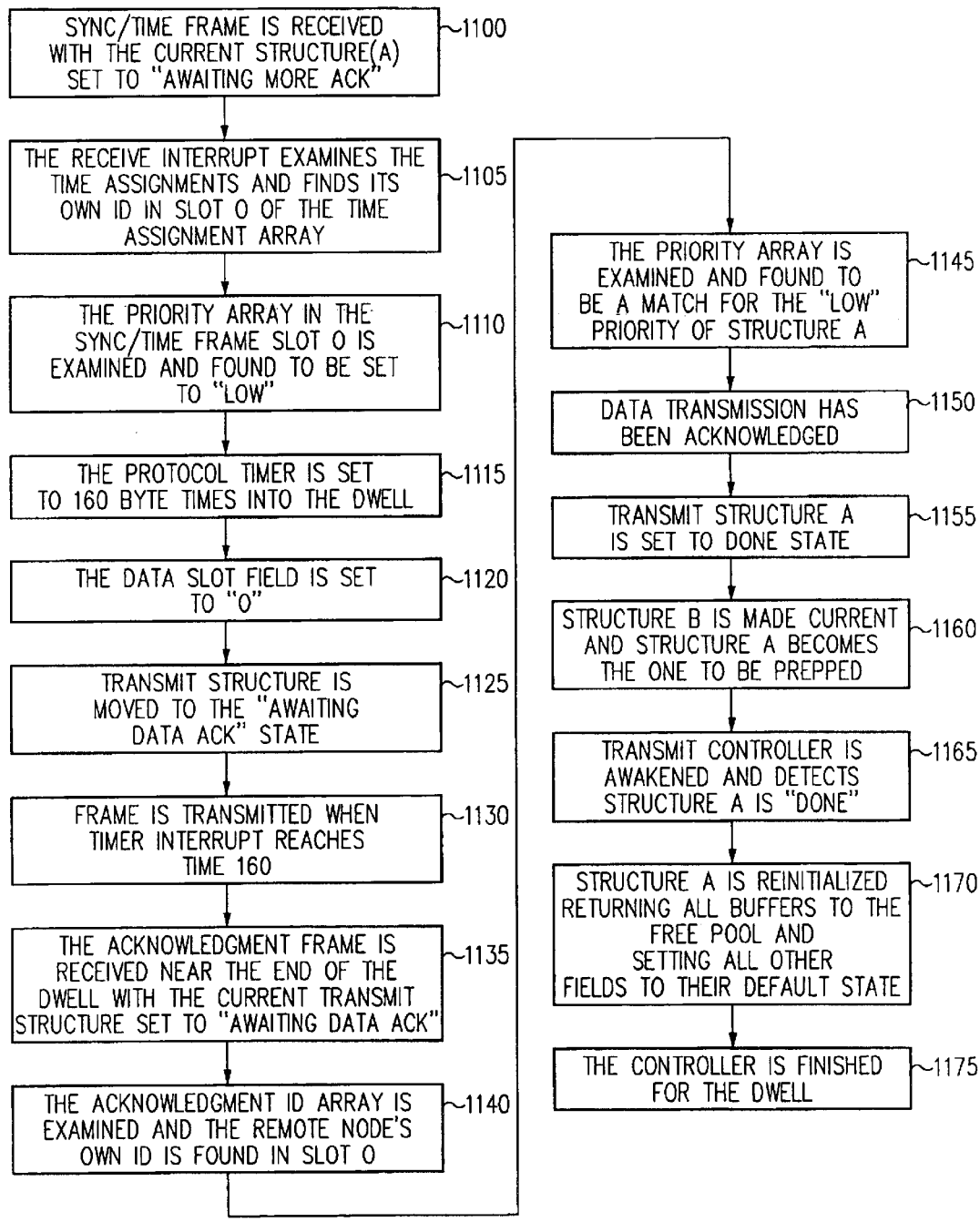
FIG. 11 shows a flow chart describing the operation of dwell 7.

The operation of this dwell is shown with the flowchart of FIG. 11. The sync/time frame is received with structure A (the one that is current) in the "awaiting more ack" state 1100. The receive interrupt examines the time assignments and finds its own remote ID in slot 0 of the time assignment array 1105. The priority array in the sync/time frame, slot 0, is examined and found to be set to "low" 1110. This constitutes a time assignment for the remote with transmission to begin at the start of data pane 0. The protocol timer is set to 160 byte times into the dwell, the start time of pane 0, 1115. The "data slot" field is set to 0, 1120. The transmit structure is moved to the "awaiting data ack" state 1125. The frame will be transmitted when the timer interrupt goes off at time 160, 1130.

The acknowledge frame is received near the end of the dwell with the current transmit structure set to "awaiting data ack" 1135. The acknowledge ID array is examined and the remote node finds its own ID in slot 0, 1140. The priority array, slot 0, is examined and found to be a match for the "low" priority of structure A, 1145. The data transmission has been acknowledged, 1150.

Transmit structure A is set to the done state 1155. Structure B is made current and structure A becomes the one ready to be prepped 1160. The transmit controller is awakened and detects structure A is "done" 1165. It reinitializes structure A, returning all its buffers to the free buffer pool and setting all other fields to their default states 1170. Since no buffers exist in the transmit queue the controller is finished for the dwell 1175.

At this point both transmit structures are in the "done" state and no data is pending in the transmit queue. The remote node has essentially returned to the quiescent state after transferring two data packets to the central node.

Enhancements and Error Recovery

The above outlined the operation of the transmit controller (in conjunction with the timer and receive interrupts) for a fairly typical transfer. Actual operation may differ, however, due to design enhancements or error conditions.

The most common error occurrence is lack of an acknowledge after transmission of a data frame. After sending the data frame and moving to the "awaiting data ack" state, no such ack is found in the acknowledge frame at the end of the dwell. This can be the result of the central node not receiving the data frame, or the remote node not receiving the acknowledge frame. If the later event occurs, the hop to the next dwell frequency will be missed and the remote node has bigger problems than the unacknowledged data frame. In the case of the dropped data frame, the central node knows in each dwell which remote nodes were given time assignments. If all the time assignments are not met with the data packet reception, the central node assumes the "left over" data packet of the remote node was received in error. The central node will repeat the time assignment for that remote node in a later dwell. The remote node, therefore, having sent a data frame and not received an acknowledgment, moves to the "awaiting more ack" state in anticipation of another time assignment transmission. The more time-out value here is taken from the "max Retrans" field of the transmit structure, which is generally much shorter than the "max reMores" value.

A remote node, while in the "awaiting more ack" state, may not receive a time assignment in a given dwell and will therefore decrement its "recount" variable. If the remote node is waiting for a time assignment due to the transmission of a bid, and that bid was never received by the central node, the remote node will continue to wait for dwell after dwell, decrementing its "recount" variable eventually to zero. When that occurs, the remote node increments its "bid tries" field and returns to the "awaiting bid dwell" state. If this rebid occurs ten times without success, the remote node gives up on transmitting that particular data frame(s) and moves to the "done" state. If the state of the alternate transmit structure is "awaiting more ack" due to a "more" size in the hopeless packet, the state of the alternate structure is moved to "awaiting bid dwell."

The most notable enhancement to the general flow of the receive interrupt processing is when a transmit structure is in the "awaiting bid dwell" state when the sync/time frame is received. Normally the remote node would decide at this point if a bid should be sent. But since the time assignments are now available to the remote node, it can determine if any other remote nodes are transmitting in that dwell. If time assignment slot 0 is unused (and slot 0 will always be the first slot the central node assigns) then no other remote nodes are scheduled for planned transmission in that dwell. The remote node can, therefore, set the "data slot" field to 0, set the "sent contended" variable, and set the state to "awaiting data ack" in the transmit structure. The remote node in effect is sending its data frame "contended." Should no other remote node do the same thing in that dwell then the central node will receive the frame and acknowledge it. If the data frame is lost and no acknowledge is forthcoming, the remote node sees from the "sent contended" variable that reverting to "awaiting more ack" for a time assignment retransmission is a useless gesture, so it instead sets its state back to "awaiting bid dwell." The fact that the "sent contended" field is set will prevent the remote node from attempting a second contended transmission of the same frame.

Central Node Packet Handing in Data Mode

The central node contains the same key packet transmission elements as the remote node, but in simplified form. Packets arrive from ethernet to the radio protocol software are concatenated into mega-buffers on a per destination basis and placed in a transmit queue. From there they are moved dwell by dwell to the transmit control structure by the transmit controller for sending out the radio port. Both the transmit controller and its structure are considerably simpler in the central however. The structure consists almost entirely of buffer information blocks for sync/time and acknowledge frames, as well as an information block array for the mega-buffers to be sent each dwell. There is no state variable, slots, or sequencing flags in the transmit control structure. Each dwell transmission begins from the current transmission structure with the sending of a sync/time frame, followed by some number of mega-packets. At the end of the dwell the ack frame is sent. The transmit controller is relegated to the relatively simple tasks each dwell of freeing any spent mega-buffers in the non-current structure, closing any open mega-buffers for transfer to the transmit queue, and reloading the buffer information array of the transmit structure from the transmit queue for as many packets as will fit in the central node's data transmission time. Of more interest at the central node is the operation of the poll and retransmission lines.

The Central Poll List

The central's poll list is a twin FIFO array of remote ID's and size requests. When a bid (or data frame with a "more" size request) is received from a remote node, the remote node's ID and size request (in panes) are copied to the next available position in the poll list. When the dwell begins, immediately prior to transmission of the sync/time frame, the central node begins to load its now empty remote ID array in the time assignment half of the frame. It does this by loading the next up remote ID in the poll list into slot 0 of the time assign ID array and setting a "panes assigned" variable to the value of slot 0's size request. A test is then made to determine if the value of "panes assigned" plus the size request of the next poll list entry exceeds the number of panes available in the dwell. If not, the "panes assigned" variable is incremented by the next size request. Such continues until the test addition indicates that there are not sufficient panes available to grant the next request, or until the poll list is empty.

The Central Retransmission List

Having granted a set of remotes' time assignments in the time assign frame, the central node is in possession of a list of remote ID's from which it expects to receive data frames in the current dwell. As each frame is received, the originating remote nodes' ID is checked off that list. At the end of the dwell, any remote node ID's which still remain are considered to have sent data packets not received properly at the central. The remaining remote nodes' ID's, and their associated size requests, are copied to the retransmission list.

The retransmission list and its handling are identical to that of the poll list with two minor differences. First, remote pane assignments are always made from the retransmission list before the poll list is serviced. Retransmission of lost data packets is considered a higher priority than new request grants. If a remote node ID and size are copied from the retransmission list to the time assignment array, the servicing of the poll list will begin with the "panes assigned" variable already at a non-zero value.

The need for the second difference arises due to the possibility of multiple consecutive packet failures. If a remote node is granted a time assignment from the retransmission list and that remote node again fails to provide the expected packet, its ID will again be left over on the time assign list and will again be copied to the retransmission list. However, this could continue forever, with disastrous results, if some mechanism were not put in place to prevent it. To do so, before a remote node's ID is copied to the retransmission list a check is first made to see if it already exists on that list. If not, it is copied to the list. If so, a counter in the list is incremented for that remote and its ID remains on the list in its current location. If the counter is incremented to a value of 3 (allowing a single remote node three retransmit assignments), the remote node is removed from the list. No assignment will be granted to it in the next dwell without a new request, and the potentially endless retransmit cycle is broken.

Remote Node Packet Handling in Voice Mode

Figure 12:
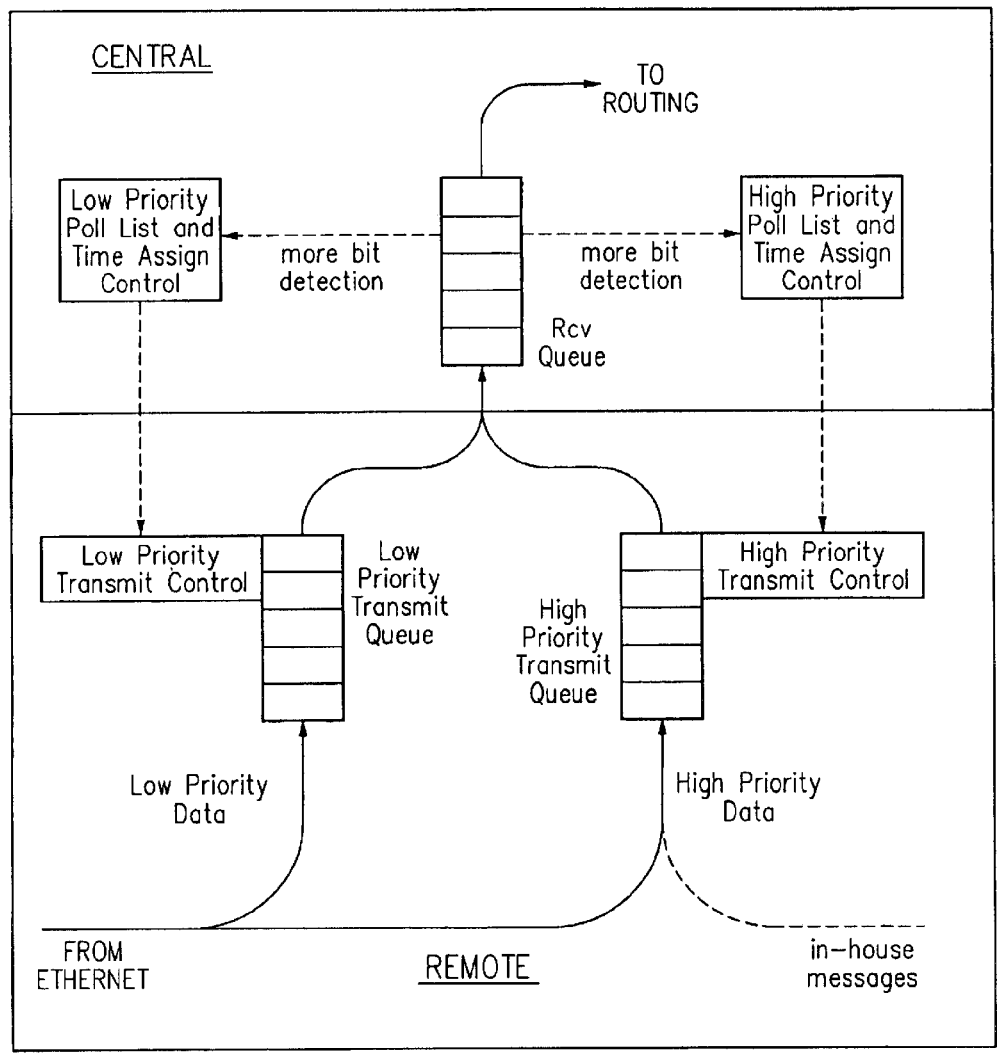
FIG. 12 illustrates a twin channel scheme.
Figure 13:
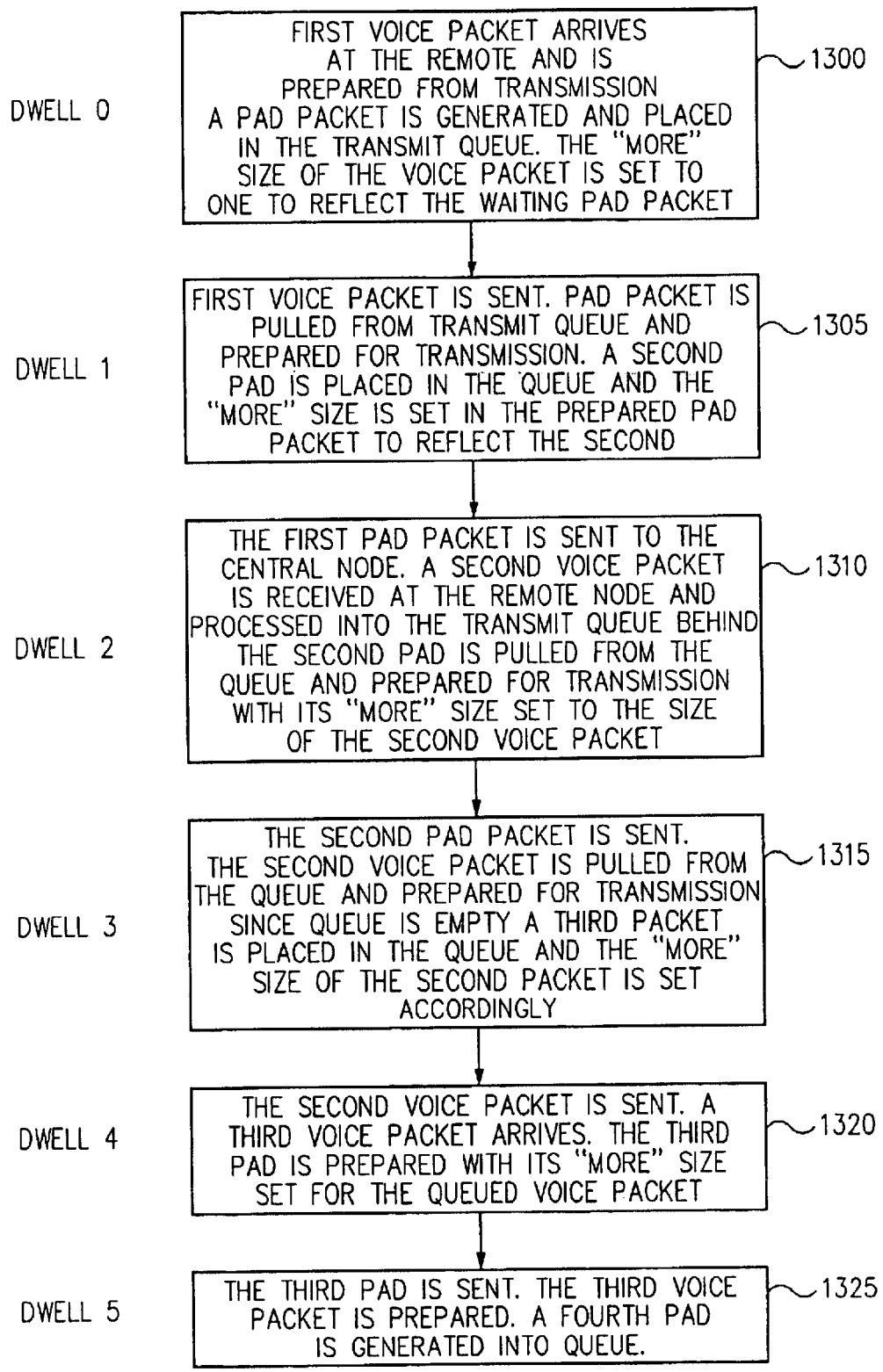
FIG. 13 shows a dwell by dwell analysis demonstrating the operation of pad packets to keep a voice channel active.

To effect the prioritization of UDP data over other protocol data, the system is essentially split into two halves. At the remote node this is done by the creation of two packet handling systems, one for UDP data and one for non-UDP data. Each priority channel has its own concatenation logic, transmit queue, transmit control logic and its associated current and non-current transmit structures. For the most part the two are unconnected, operating completely independently, and can be considered to be two separate channels. The operation of each channel is identical to that described in above with a few minor exceptions. FIG. 12 shows the key elements of the twin channel scheme.

UDP data is separated from other protocol data and sent to the high priority channel concatenater for incorporation into mega-buffers. These buffers are then transferred to the high priority transmit queue by the high priority transmit controller, and will be loaded into the high priority non-current transmit structure. The state of that structure is set to "awaiting bid dwell" or "awaiting more ack" as is appropriate for the circumstance. The same process is followed with the non-UDP data in the low channel transmit elements. The result is eventually two current transmit structures interacting independently with the central node at each remote node.

There are several ways in which the handling of packets in data mode described above is slightly modified to accommodate dual channel voice prioritization, which is now discussed.

Precedence of Bids

If a sync/time assign packet arrives at a remote node while both priority current transmit structures are in the "awaiting bid dwell" state, the high priority transmit structure is serviced first. If time assign slot 0 of the sync/time frame is unused (indicating that no remote nodes are assigned transmission slots in this dwell) then the "data slot" variable of the high priority structure will be set to 0 and the high priority structure state will be set to "awaiting data ack." The high priority channel, in other words, transmits "contended." Should there not be the opportunity to transmit in such a way, but the congestion manager indicates that this would be an appropriate dwell to issue a bid, the high priority channel will do so, setting the bid slot of its transmission structure to 0 or 1 and moving its state to "awaiting more ack." In either case processing of the low priority channel "awaiting bid dwell" is postponed for the dwell. The low priority channel remains in the "awaiting bid dwell" state until the next sync/time frame is received.

Pad Packets

Since delay is the most critical consideration in voice data streams, it is highly desirable to keep a voice channel continuously active, and not allow it to fall back into the bid cycle until the data stream has truly stopped. The dwells of the present invention in voice mode being shorter than the packet transmit rate of the voice sampling source, it is highly likely that when a voice packet is processed by the transmit controller there will be no others in the transmit queue to warrant setting a "more" size in each voice packet. In the extreme, this could cause a remote to have to perform a bid cycle for every voice packet. This is precisely the situation which should be avoided.

The present invention's response to this problem is the creation and transmission of "pad" packets. Pad packets are dummy frames that need exactly one remote data pane to transmit. Their purpose is to carry a "more" size where one would not ordinarily exist. They are tagged in their corn headers as pad packets, so the central knows to process the more request onto its poll list and then dispose of the packet. Two such pad packets may be sent consecutively.

The following dwell by dwell analysis demonstrates the operation of pad packets to keep a voice channel active. It is assumed that real voice packets arrive from their source to the radio software every even numbered dwell; that the pad packet is large enough to require one pane to send; and that no other activity is present in the system.

Dwell 0 The first voice packet arrives at the remote and is prepared for transmission. Since there are no other voice packets in the transmit queue, a pad packet is generated and placed in the transmit queue. The "more" size of the voice packet is then set to one pane to reflect the waiting pad packet 1300.

Dwell 1 The first voice packet is sent. The pad packet is pulled from the transmit queue and prepared for transmission. Since no new voice packet yet exists a second pad is placed in the queue and the "more" size is set in the prepared pad packet to reflect the second 1305.

Dwell 2 The first pad packet is sent to the central node. A second voice packet is received at the remote node and processed into the transmit queue behind the second pad. The second pad is pulled from the queue and prepared for transmission, with its "more" size set to the size of the second voice packet 1310.

Dwell 3 The second pad packet is sent. The second voice packet is pulled from the queue and prepared for transmission. Since the queue is now empty a third pad packet is placed in the queue and the "more" size of the second packet is set accordingly 1315.

Dwell 4 The second voice packet is sent. A third voice packet arrives. The third pad is prepared with its "more" size set for the queued voice packet 1320.

Dwell 5 The third pad is sent. The third voice packet is prepared. A fourth pad is generated into the queue 1325 and so on. The use of pad packets acts to keep the remote node "on-line" with respect to the central node's poll list during the intervening dwells when no voice packets arrive. A potential for enhancement exists if one were to replace the pad packet size with that of the actual voice packet in dwell 2 and similar instances. This can be done if the voice packets are the same size from dwell to dwell (or the "more" system will not work), but the added complexity does not seem worth a worst case 13 ms latency.

Central Node Packet Handling in Voice Mode

The real prioritization of UDP data over low priority data is done at the central node. Here the dual channel architecture of the remote is duplicated to a certain extent, but not with the complexity present in the remote node.

The Central Node's Transmit Control Elements

At the central node, the ethernet data stream is split into UDP and non-UDP partitions. These two types are concatenated separately and placed into twin transmit queues. The need to do this at the central node is not entirely obvious. The central node could just stream ethernet data out to the remote nodes as it was received without regard to its protocol type. One of the requirements of the system, however, is to reserve a fixed percentage of the RF bandwidth, from 12.5% to 50% in 12.5% steps. To maintain these proportions the central node splits the data stream into two channels, and then regulates the throughput in those channels based on the reserve percentage set by the user.

Since the central node's transmit control structure does not have a state machine here does not need to be two of them. A single transmit controller loads packets into a single transmit control structure for transmission each dwell. The queue from which the packets are taken is switched at regular intervals to effect outbound channelization and reserve percentage maintenance.

The Central Node's Poll and Retransmit Lists

The key to regulation of voice and data bandwidths at the remote nodes lies in the central node's poll lists. Twin poll and retransmission lists are provided to service the high and low priority channels. Voice data is gated from the remotes by servicing the high priority poll list in a given dwell. Low priority transfer percentage is maintained by regulating the interval at which the data channel poll list is serviced.

The method for voice/data channelization is to create sets of "data dwells" and "voice dwells." The unit for channelization is an 8 dwell super dwell. Of those 8 dwells, some are tagged as data dwells and the remainder as voice. Data dwells are always interleaved with the voice dwells so that a voice dwell occurs at worst with only one intervening data dwell. The data channel reserve percentage is then fixed by the number of data dwells occurring in the 8 dwell set, and regulated from 12.5% (1 data dwell in 8) to 50% (4 data dwells in 8) in 12.5% increments.

A data dwell is defined to be a dwell in which the low priority retransmission and poll lists are serviced first. Should the low priority queues be exhausted before the maximum number of remote node data panes is assigned, the remainder are allotted by servicing the high priority queues. In a voice dwell the poll lists are serviced in the reverse order. The high priority poll and retransmission lists are taken care of first, and if any remote panes are left, they are assigned from the low priority lists. Appendix A shows the servicing order of the central node's poll and retransmission lists in each dwell of the eight dwell set for the five priority level settings.

Note that in Appendix A, a priority level of 5 (priority disable, data mode) the high priority poll lists are serviced first. That is because in-house messages, such as registration frames and auto-pings, are treated as high priority data. Since in data mode there is no UDP separation, the only frames in the high priority queue are these in-house messages. Treating these frames as high priority data prevents them from being stacked up behind a large number of queued data packets and not being processed in a timely manner.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range and equivalence thereof are intended to be embraced.

What is claimed is:

1. In a communications network, a communications protocol having a data mode channel and a voice mode channel comprising:

having dwell time, and doubling frequency hopping interval in a voice mode priority channel;

independently operating bidding, data transmission, acknowledgment, and retransmission of the data mode and voice mode channels; and inserting pad packets to promote voice mode channel connectivity.

2. In a two channel (voice/data) environment in which a fixed percentage of RF bandwidth is reserved for the data priority channel, a communications protocol comprising:

regulating the reserved data channel percentage via two independent poll lists;

creating voice dwells and data dwells to permit variable reserved percentages of the data channel; and interleaving of data and voice dwells to promote fixed latency in the voice channel.

3. A method to arbitrate channels of communications between a first device and at least one second device of a plurality of devices, comprising the steps of:

dividing dwell time into as many segments as there are desired communication channels;

dedicating each divided segment to the desired communication channel;

independently operating bidding, data transmission, acknowledgment, and retransmission of the communication channels; and inserting pad packets to promote connectivity of the communication channels.

4. A method to arbitrate channels of communications between a first device and at least one second device of a plurality of second devices, comprising the steps of:

dividing dwell time and dedicating a first half of the divided dwell time as a voice channel and remaining half as a data channel;

doubling frequency hopping interval of the voice channel;

independently operating bidding, data transmission, acknowledgment, and retransmission of the communication channels; and inserting pad packets to promote voice channel connectivity.

5. The communications protocol of claim 1, wherein inserting said pad packets ensures voice mode channel connectivity.

6. The communications protocol of claim 2, wherein inserting said pad packets ensures fixed latency in the voice channel.

7. The communications protocol of claim 2, wherein inserting said pad packets guarantees fixed latency in the voice channel.

8. The method of claim 3, wherein inserting said pad packets ensures connectivity of the communication channels.

9. The method of claim 4, wherein inserting said pad packets ensures voice channel connectivity.

* * * * *